May 13, 1924.
J. GLANZ
PEDAL
Filed Dec. 8, 1922
1,493,876
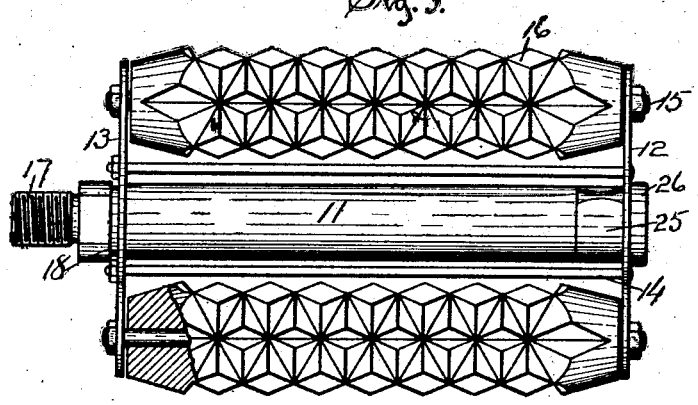 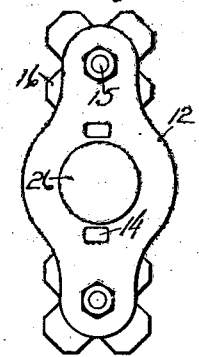
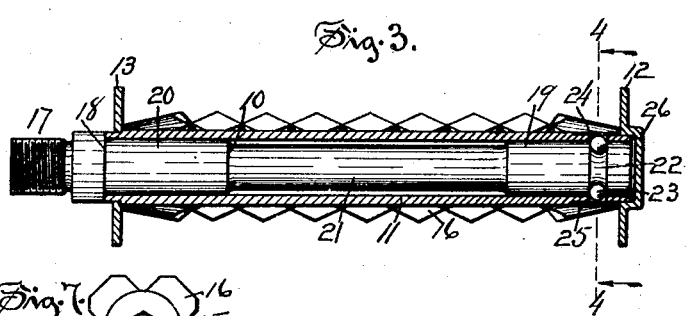 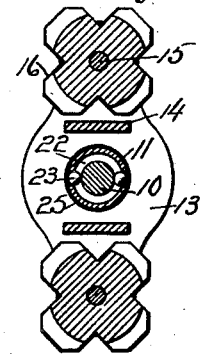
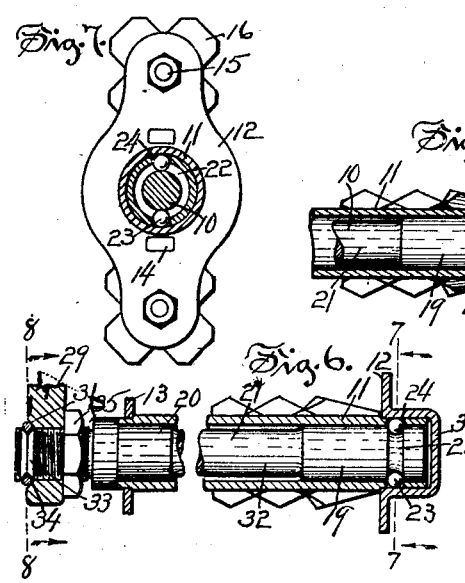 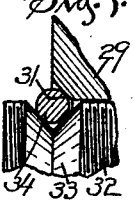 
INVENTOR
Joseph Glanz.
by
Arthur G Jenkins
ATTORNEY Patented May 13, 1924.

1,493,876

UNITED STATES PATENT OFFICE.

JOSEPH GLANZ, OF HARTFORD, CONNECTICUT.

PEDAL.

Application filed December 8, 1922. Serial No. 605,602.

*To all whom it may concern:*

Be it known that I, JOSEPH GLANZ, a citizen of the United States, and a resident of Hartford, in the county of Hartford and State of Connecticut, have invented new and Improved Pedals, of which the following is a specification.

My invention relates to devices for securing rotating members upon or within their supports and as especially, though not exclusively, exemplified in pedals for bicycles or similar vehicles, and an object of my invention, among others, is to provide means for securing said rotating members in a manner to permit the parts to be readily engaged and disengaged; and a further object of the invention is to provide means for so securing said parts together as to simplify the construction of said parts.

Different forms of pedals embodying my invention and in the construction and use of which the objects herein set out, as well as others, may be attained, is illustrated in the accompanying drawings, in which—

Figure 1 is a side view of a pedal embodying my invention.

Figure 2 is an end view of the same.

Figure 3 is a view in lengthwise central section through the sleeve of the device shown in Figure 1 and illustrating the manner of securing the sleeve to the spindle.

Figure 4 is a view in cross section on a plane denoted by the dotted line 4—4 of Figure 3.

Figure 5 is a view in section lengthwise through the center of one end of a sleeve showing a little different construction of pedal frame.

Figure 6 is a view similar to Figure 5 but illustrating a little different construction of the pedal frame, this construction, however, being considered by me as the preferred form.

Figure 7 is an end view of a pedal embodying the construction of Figure 6.

Figure 8 is a view in section on a plane denoted by the dotted line 8—8 of Figure 6.

Figure 9 is a view, scale enlarged, of a portion of the device shown in Figure 6 and illustrating the engagement of the crank with the locking member to force the latter into its groove.

While my invention is illustrated and described herein as embodied in a pedal designed for use in bicycles or similar vehicles, yet I contemplate its application to other structures in which a rotating member is supported to rotate upon or within its support and the invention is not, therefore, to be considered as embodied exclusively in pedal constructions.

In the accompanying drawings my improved structure is shown as embodied in a spindle 10, and a pedal frame comprising a sleeve 11, end plates 12—13, tie members 14, pad supporting rods 15 and pads 16, all secured together in a manner now to be described.

The spindle 10 is provided with any suitable means for attachment to a crank (see Figure 6) as a screw threaded end 17, this spindle also having a shoulder 18 and bearings 19—20 located on opposite sides of the lengthwise center of the spindle and at or near the ends of the spindle with a reduced portion 21 between said bearings. This spindle is also provided with a locking groove 22 to receive retainers 23 for securing the frame to the spindle.

The sleeve 11 in all of the structures herein illustrated is of cylindrical shape with the opening therein of a size to fit the bearings 19—20 so as to rotate freely thereon, said sleeve having a retainer hole or holes 24 for passage of the retainers 23. These retainers are preferably in the shape of balls that may be inserted through said holes to engage the locking groove 22, such retainers being of a size to extend from the groove into said hole or holes and thereby secure the sleeve and consequently the pedal frame to the spindle. It will be observed that the retainers may be readily removed through said holes to permit the sleeve, and consequently the pedal frame, to be removed from the spindle.

I contemplate several different ways to prevent the accidental escape of the retainers from their locking position. In the structure shown in Figures 1 to 4 of the drawings I provide a cover 25 in the form of a split spring collar that closely fits upon the sleeve 11, near its end, the fit being such as to prevent accidental movement of the collar, but such as to permit movement thereof by some force applied to rotate it. The ends of this collar are separated a distance slightly less than the diameter of the retainers so that the latter may be forced through the space between the ends of the collar and into the retainer hole or holes when the space between such ends registers with such hole or holes. Similarly the ends of the collar may be sprung apart sufficiently to permit removal of such retainers to release the sleeve and permit removal of the pedal frame from the spindle.

In this form of the device the end plates 12—13 are permanently secured together by the tie bars 14 that may be fastened in place as by nuts, said bars having shoulders seated against the opposite faces of the plates from the threaded ends, and the rods 15 are removably secured, as by nuts fitting the screw threaded ends of the rods. By this means the pedal frame is always intact and the pads 16 may be removed, as for renewal or otherwise, without taking the frame apart. The end plate 12 has a cap 26 formed integral with it and projecting beyond its outer surface, said cap fitting upon and closing the opening in the sleeve 11.

In that form of the device illustrated in Figure 5 the structure of the pedal frame and the means for retaining it in place on the spindle are the same as hereinabove described with the exception of the cap for closing the opening into the sleeve. In this form of the device the cap 27 is separately formed from the end plate 12 and this cap also is of a length to cover the hole or holes 24 in the sleeve, said cap projecting through and closely fitting a hole in the end plate and having a shoulder 28 against which said end plate rests, the end of the cap inside of said plate being of a length to extend across said hole or holes and thus close them and thereby prevent the accidental escape of the retainers from their locking positions.

In that form of the device shown in Figure 6 and which I have found to produce most satisfactory results, the structure of the pedal frame is almost a duplicate of the structure shown in Figures 1 to 4 with the single exception that the cap 30 integrally formed with the end plate 12 projects a little further in an outwardly direction from said end plate in the device of Figure 6 than in the device of Figures 1 to 4. This is to enable the cap to extend across the hole or holes 24 and thereby prevent the accidental escape of the retainers 23, this construction locating the end plate 12 a little nearer to the end plate 13 than in the structure of Figure 1.

In this device of Figure 6 I have shown an improved means for fastening the spindle to a crank, which crank 29 has an opening to receive the end of a spindle and preferably a recess 31 at the mouth of said opening. This spindle 32 has a locking groove 33 to receive a spindle lock 34 in the form of a split spring ring. In the preferred form of construction said locking groove is of such depth that the spindle lock will sink into the groove for more than half its diameter. The lock is forced into the groove 33 by engagement with the walls of the locking recess 31 in the crank 29 by means of a nut 35 fitting a threaded part of the spindle next to the crank. When the lock is thus drawn into the recess it will be compressed into the locking groove so that the walls of the recess in the crank will engage its outer rounded surface and thereby force the ring or lock into the groove and consequently tightly secure the spindle in place.

I claim—

1. A pedal supporting spindle and a pedal frame including a sleeve within which said pedal supporting spindle is received, one of said parts having a groove and the other of said parts having an opening registering with said groove, a locking member insertible through said opening into said groove to lock said sleeve in rotatable engagement with said spindle, and a member movably mounted to cover said opening and prevent the escape of the locking member from said groove.

2. A pedal supporting spindle having a groove therein, a pedal frame including a sleeve within which said pedal supporting spindle is received, said sleeve having an opening registering with said groove, a locking member insertible through said opening into said groove to lock said sleeve in rotatable engagement with said spindle, and a cover slidable on said sleeve to cover said opening and prevent escape of the locking member from said groove.

3. A pedal supporting spindle having a groove therein, a pedal frame including a sleeve within which said spindle is received, said sleeve having an opening registering with said groove, a locking member insertible through said opening into said groove to lock said sleeve in rotatable engagement with the spindle, and a cap comprising an integral part of said frame, said cap slidably engaging said sleeve to cover said opening and prevent escape of said locking member from said groove.

4. A pedal supporting spindle having a groove therein, a pedal frame including a sleeve within which said spindle is received, said sleeve having an opening to register with said groove, a locking member insertible through said opening into said groove to lock said sleeve in rotatable engagement with said spindle, an end plate comprising a part of said pedal frame, and a cap integrally formed with said end plate, said cap slidably engaging said sleeve to cover said opening and prevent escape of said locking member from said groove.

5. A pedal supporting spindle having a groove therein, a pedal frame including a sleeve within which said spindle is received, said sleeve having an opening registering with said groove, a locking member insertible through said opening into said groove to lock said sleeve in rotatable engagement with said spindle, end plates comprising a portion of said frame, means for rigidly securing said end plates in place in said frame, and a cap comprising an integral part of one of said end plates and slidably engaging said sleeve to cover said opening and prevent escape of said locking member from said groove.

JOSEPH GLANZ.